United States Patent
Mullin et al.

(10) Patent No.: US 11,218,503 B2
(45) Date of Patent: Jan. 4, 2022

(54) SYSTEM AND METHOD FOR IMPLEMENTING A VULNERABILITY MANAGEMENT MODULE

(71) Applicant: JPMorgan Chase Bank, N.A., New York, NY (US)

(72) Inventors: Andrew J. Mullin, Cypress, TX (US); Hai Van Nguyen, Houston, TX (US); Binh Nguyen, Sugarland, TX (US); Jason S. Thacker, Cypress, TX (US); Nicholas R. Adam, The Woodlands, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 234 days.

(21) Appl. No.: 16/517,064

(22) Filed: Jul. 19, 2019

(65) Prior Publication Data
US 2021/0021630 A1 Jan. 21, 2021

(51) Int. Cl.
*H04L 29/06* (2006.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 8,407,798 | B1 * | 3/2013 | Lotem ................... | G06F 21/577 726/25 |
| 9,438,623 | B1 * | 9/2016 | Thioux ............... | H04L 63/1466 |
| 10,671,726 | B1 * | 6/2020 | Paithane ............... | G06F 21/562 |
| 10,715,542 | B1 * | 7/2020 | Wei ....................... | G06F 16/958 |
| 2003/0126472 | A1 * | 7/2003 | Banzhof ............... | G06F 21/577 726/25 |
| 2005/0132206 | A1 * | 6/2005 | Palliyil ................. | G06F 21/645 713/188 |
| 2015/0172311 | A1 * | 6/2015 | Freedman ........... | H04L 63/1441 726/1 |
| 2017/0034200 | A1 * | 2/2017 | Costin ............... | G06F 16/24578 |

(Continued)

OTHER PUBLICATIONS

Official Communication (Search Report and Written opinion) issued in W.I.P.O Patent Application No. PCT/US2020/041938, dated Oct. 13, 2020.

*Primary Examiner* — Sarah Su
(74) *Attorney, Agent, or Firm* — Greenblum & Bernstein, P.L.C.

(57) ABSTRACT

Various methods, apparatuses/systems, and media for implementing a vulnerability management module are provided. A receiver receives a request for dynamically scanning vulnerability of a target computing device based on testable vulnerability criteria extracted from a database. A processor dynamically executes the testable vulnerability criteria from the SCCM based on the received request; creates a static SCCM advertisement with a dynamic pre/post validation check capability based on a result of the dynamically executing the testable vulnerability criteria; reports a success or a failure of the static SCCM advertisement related to the testable vulnerability criteria to indicate whether a vulnerability exists within the target computing device; and automatically remediates the vulnerability when it is determined that the vulnerability exists within the target computing device.

15 Claims, 7 Drawing Sheets

(56) References Cited

U.S. PATENT DOCUMENTS

| | | | | |
|---|---|---|---|---|
| 2017/0149815 A1* | 5/2017 | Bolgert | ............... | H04L 63/1425 |
| 2017/0220800 A1* | 8/2017 | Niemela | ............. | H04L 63/1433 |
| 2018/0032736 A1* | 2/2018 | Inagaki | ............. | G06Q 10/0635 |
| 2018/0351987 A1* | 12/2018 | Patel | .................... | H04L 63/1433 |
| 2019/0081968 A1* | 3/2019 | Wang | ....................... | G06F 21/31 |
| 2019/0163886 A1* | 5/2019 | Mahkonen | ............. | G06F 21/14 |
| 2019/0342324 A1* | 11/2019 | Nawy | .................. | G06F 16/2228 |
| 2020/0314135 A1* | 10/2020 | Kang | ................... | H04L 9/0643 |

* cited by examiner

SYSTEM AND METHOD FOR IMPLEMENTING A VULNERABILITY MANAGEMENT MODULE

TECHNICAL FIELD

This disclosure generally relates to vulnerability management, and, more particularly, to methods and apparatuses for implementing a vulnerability management module for dynamically managing and executing testable vulnerability criteria from a system center configuration manager.

BACKGROUND

Computer networks and systems have become important components for management of enterprises worldwide. Computer network environments may be configured for virtually every enterprise or organization, typically with multiple interconnected computers (e.g., end user computers, laptops, servers, printing devices, etc.). Unfortunately, computer networks and systems may be vulnerable to various types of attacks that have varying levels of impact. Today's large enterprises may employ a growing number of persistent agents on computer endpoints to provide specific functionalities related to, for example, software delivery, asset inventory, and security agents. Security agents in particular may have real potential to interfere with each other, impacting user experience or system availability. Further, each additional agent may increase endpoint resource utilization in terms of memory, processor, disk, and communications overhead.

Enterprises of all sizes are increasingly adopting endpoint virtualization to reduce underutilized computers by sharing resources across multiple virtual endpoints. This shared resource strategy typically may reduce endpoint resource availability. In this environment, it is desirable to integrate more functionality into existing services to reduce resource overhead. Although Microsoft® System Center Configuration Manager's (SCCM's) software delivery mechanism may provide native lifecycle management for patching and software, the SCCM does not provide functionality for lifecycle vulnerability management.

SUMMARY

The present disclosure, through one or more of its various aspects, embodiments, and/or specific features or sub-components, provides, among other features, various systems, servers, devices, methods, media, programs, and platforms for implementing a vulnerability management module for dynamically managing and executing testable vulnerability criteria from SCCM (i.e., an SCCM agent), thereby removing the need for a separate vulnerability management solution and agent, and reducing endpoint utilization in terms of memory, processor, disk, and communications overhead. The various aspects, embodiments, features, and/or sub-components provide optimized processes of implementing a vulnerability management module for dynamically managing and executing testable vulnerability criteria from SCCM, thereby changing SCCM advertisement from static to dynamic, providing lifecycle vulnerability management capabilities natively to SCCM, re-purposing SCCM native reporting capabilities for vulnerability management, re-purposing the intended use of static pre/post validation checks for software installation to a dynamic pre/post validation checks for vulnerabilities, leveraging SCCM classification of software installed or not installed as a means to determine if a vulnerability is applicable or not applicable, and leveraging SCCM classification of not installed (not applicable) to determine when vulnerabilities are remediated, but the disclosure is not limited to these above-noted enhancements to the existing functionalities of Microsoft's SCCM.

According to an aspect of the present disclosure, a method for implementing a vulnerability management module, for configuring a system center configuration manager (SCCM) to provide lifecycle vulnerability management capabilities natively to the SCCM, by utilizing one or more processors and one or more memories is disclosed. The method may include: providing a database that stores testable vulnerability criteria; receiving, by a target computing device that includes an SCCM agent, a request for dynamically scanning vulnerability of the target computing device based on the testable vulnerability criteria; dynamically executing the testable vulnerability criteria from the SCCM agent based on the received request; creating a static SCCM advertisement with a dynamic pre/post validation check capability based on a result of the dynamically executing the testable vulnerability criteria; reporting a success or a failure of the static SCCM advertisement related to the testable vulnerability criteria to indicate whether a vulnerability exists within the target computing device; and automatically remediating the vulnerability when it is determined that the vulnerability exists within the target computing device.

According to a further aspect of the present disclosure, wherein the creating a static SCCM advertisement with a dynamic pre/post validation check may include: dynamically extracting the testable vulnerability criteria from the database; dynamically executing evaluation criteria for the target computing device based on the extracted testable vulnerability criteria; and dynamically adding an affected component of the target computing device to an SCCM static software advertisement specific to a matching vulnerability.

According to yet another aspect of the present disclosure, the testable vulnerability criteria may include vulnerability signatures related to positive and negative criteria, and the method may further include: receiving a request from the target computing device for extracting the vulnerability signatures related to the positive and negative criteria from the database; dynamically determining whether signatures are required for a vulnerability to be applicable to the target computing device based on the received request for the vulnerability signatures; transmitting a signature payload to the SCCM of the target computing device based on a determination that a signature related to the positive criteria is required for the vulnerability to be applicable to the target computing device; executing the signature payload using native SCCM scripting language; and identifying a vulnerability signature for a positive match.

According to a further aspect of the present disclosure, wherein, when the vulnerability signature is identified for the positive match, the method may further include: identifying a vulnerability signature for a negative match; evaluating the negative criteria; requesting, by the target computing device that includes an SCCM agent, a new advertisement based on the positive criteria and/or the negative criteria; creating a static payload for each positive match vulnerability; creating an advertisement for each static payload with identified true risk rating based on the negative criteria; and requesting for statically scanning vulnerability of the target computing device based on the created advertisement for each static payload. According to exemplary embodiments, the new advertisement may be based on a combination of both the positive criteria and the negative criteria in cases where the vulnerability risk may be reduced but not completely mitigated.

According to another aspect of the present disclosure, the positive criteria may include information that indicates that a vulnerable piece of software is installed on the target computing device.

According to an additional aspect of the present disclosure, the negative criteria may include information that indicates that even though a vulnerable piece of software is installed on the target computing device, the target computing device is not actually vulnerable because of a preinstalled control software in the target computing device that mitigates the vulnerable piece of software. According to exemplary embodiments, the negative criteria may refer to configuration settings (e.g., vulnerability mitigation via enabled/disabled operating system or application features/services, access control restrictions, disabled ports) or environmental factors (e.g., network/protocol access restricted via segmentation/firewall/proxy) or a combination of both configuration settings and environmental factors, but the disclosure is not limited thereto.

According to yet another aspect of the present disclosure, the method may further include determining whether a vulnerability is applicable or not applicable to the target computing device by reconfiguring a classification functionality of the SCCM.

According to an aspect of the present disclosure, the method may further include determining whether a vulnerability is remediated from the target computing device by reconfiguring a classification functionality of the SCCM.

According to a further aspect of the present disclosure, a system for implementing a vulnerability management module for configuring a system center configuration manager (SCCM) to provide lifecycle vulnerability management capabilities natively to the SCCM is disclosed. The system may include a database that stores testable vulnerability criteria, a receiver configured to receive a request for dynamically scanning vulnerability of a target computing device that includes an SCCM agent based on the testable vulnerability criteria; and a processor coupled to the database and the receiver via a communication network. The processor may be configured to: dynamically execute the testable vulnerability criteria from the SCCM agent based on the received request; create a static SCCM advertisement with a dynamic pre/post validation check capability based on a result of the dynamically executing the testable vulnerability criteria; report a success or a failure of the static SCCM advertisement related to the testable vulnerability criteria to indicate whether a vulnerability exists within the target computing device; and automatically remediate the vulnerability when it is determined that the vulnerability exists within the target computing device.

According to an aspect of the present disclosure, the processor may be further configured to: dynamically extract the testable vulnerability criteria from the database; dynamically execute evaluation criteria for the target computing device based on the extracted testable vulnerability criteria; and dynamically add an affected component of the target computing device to an SCCM static software advertisement specific to a matching vulnerability.

According to another aspect of the present disclosure, wherein the testable vulnerability criteria may include vulnerability signatures related to positive and negative criteria, and the receiver may be configured to receive a request from the target computing device for extracting the vulnerability signatures related to the positive and negative criteria from the database, and the processor may be further configured to: dynamically determine whether signatures are required for a vulnerability to be applicable to the target computing device based on the received request for the vulnerability signatures; transmit a signature payload to the SCCM of the target computing device based on a determination that a signature related to the positive criteria is required for the vulnerability to be applicable to the target computing device; execute the signature payload using native SCCM scripting language; and identify a vulnerability signature for a positive match.

According to yet another aspect of the present disclosure, the vulnerability signature may be identified for the positive match, and the processor may be further configured to: identify a vulnerability signature for a negative match; evaluate the negative criteria; request, by the target computing device that includes an SCCM agent, a new advertisement based on the positive criteria and/or the negative criteria; create a static payload for each positive match vulnerability; create an advertisement for each static payload with identified true risk rating based on the negative criteria; and request for statically scanning vulnerability of the target computing device based on the created advertisement for each static payload.

According to another aspect of the present disclosure, a non-transitory computer readable medium configured to store instructions for implementing a vulnerability management module for configuring a system center configuration manager (SCCM) to provide lifecycle vulnerability management capabilities natively to the SCCM is disclosed. The instructions, when executed, may cause a processor to perform the following: receiving, by a target computing device that includes an SCCM agent, a request for dynamically scanning vulnerability of the target computing device based on testable vulnerability criteria stored onto a database; dynamically executing the testable vulnerability criteria from the SCCM agent based on the received request; creating a static SCCM advertisement with a dynamic pre/post validation check capability based on a result of the dynamically executing the testable vulnerability criteria; reporting a success or a failure of the static SCCM advertisement related to the testable vulnerability criteria to indicate whether a vulnerability exists within the target computing device; and automatically remediating the vulnerability when it is determined that the vulnerability exists within the target computing device.

According to a further aspect of the present disclosure, when executed, the instructions may further cause the processor to perform the following: dynamically extracting the testable vulnerability criteria from the database; dynamically executing evaluation criteria for the target computing device based on the extracted testable vulnerability criteria; and dynamically adding an affected component of the target computing device to an SCCM static software advertisement specific to a matching vulnerability.

According to another aspect of the present disclosure, the testable vulnerability criteria may include vulnerability signatures related to positive and negative criteria, and when executed, the instructions may further cause the processor to perform the following: receiving a request from the target computing device for extracting the vulnerability signatures related to the positive and negative criteria from the database; dynamically determining whether signatures are required for a vulnerability to be applicable to the target computing device based on the received request for the vulnerability signatures; transmitting a signature payload to the SCCM of the target computing device based on a determination that a signature related to the positive criteria is required for the vulnerability to be applicable to the target computing device; executing the signature payload using native SCCM scripting language; and identifying a vulnerability signature for a positive match.

According to an aspect of the present disclosure, the vulnerability signature may be identified for the positive match, and the instructions, when executed, may further cause the processor to perform the following: identifying a vulnerability signature for a negative match; evaluating the negative criteria; requesting, by the target computing device that includes an SCCM agent, a new advertisement based on the positive criteria and/or the negative criteria; creating a static payload for each positive match vulnerability; creating an advertisement for each static payload with identified true risk rating based on the negative criteria; and requesting for statically scanning vulnerability of the target computing device based on the created advertisement for each static payload.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
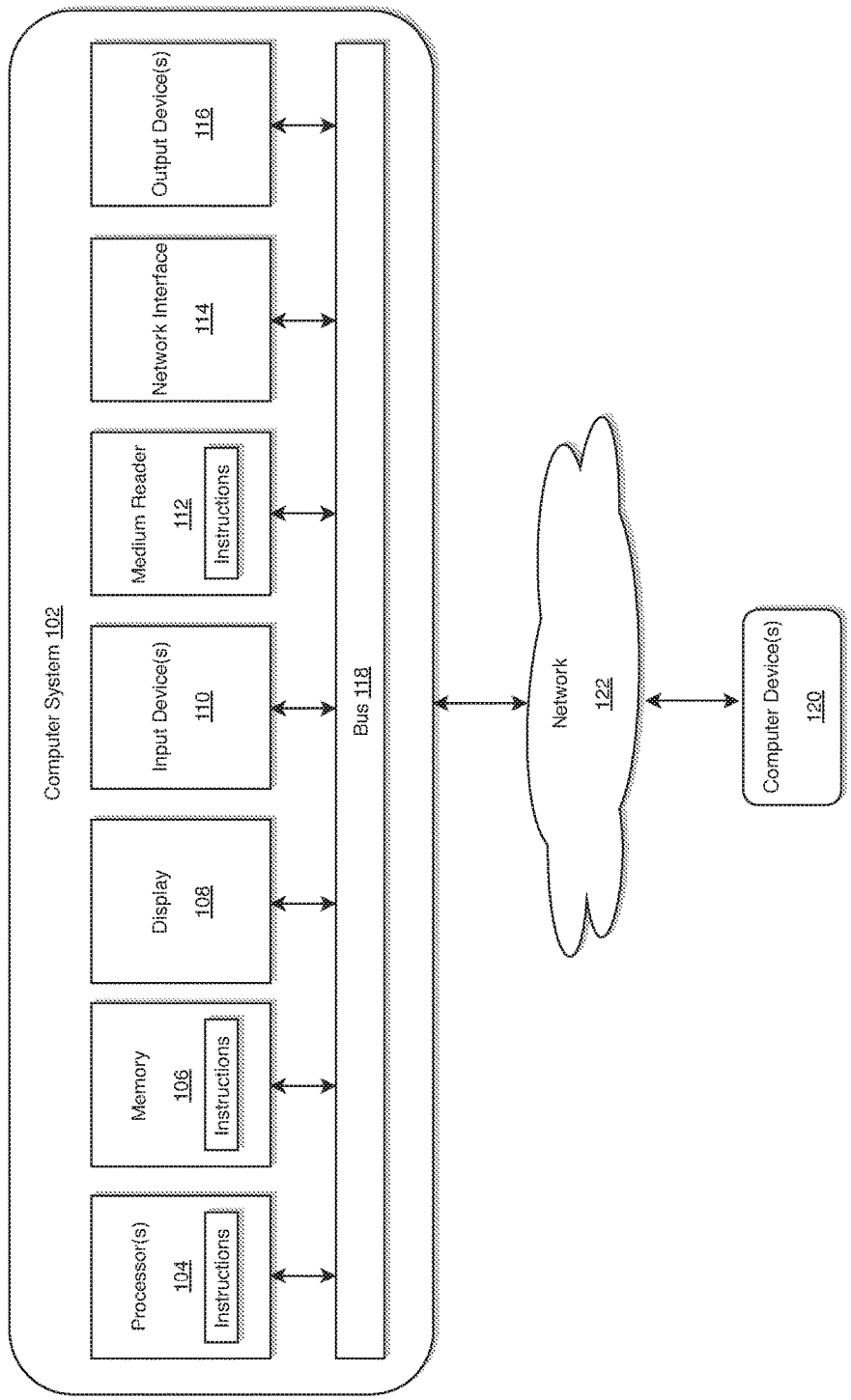
FIG. 1 illustrates a computer system for implementing a vulnerability management module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any tune. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof, Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing om the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
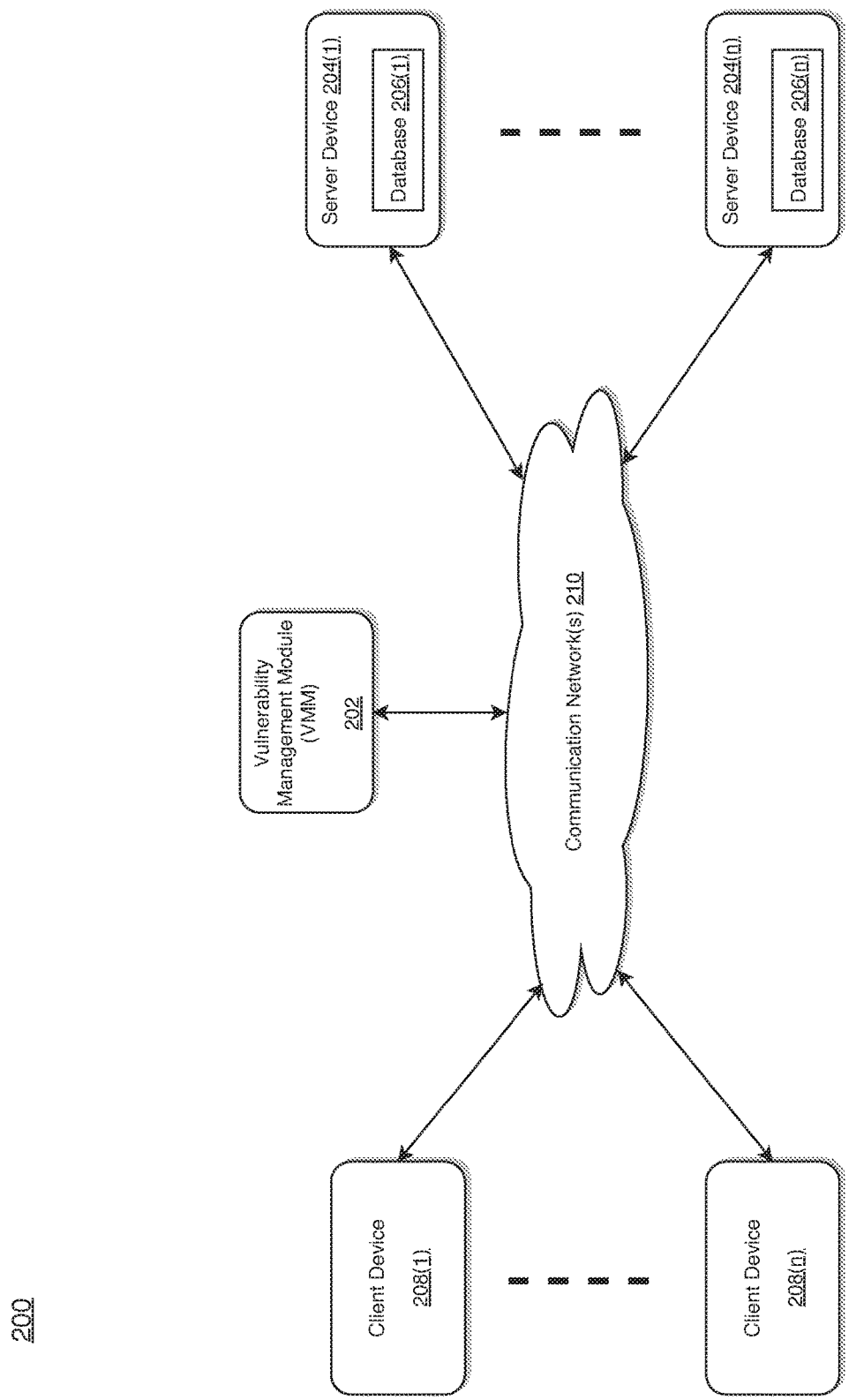
FIG. 2 illustrates an exemplary diagram of a network environment with a vulnerability management module in accordance with an exemplary embodiment.

Referring to FIG. 2, a schematic of an exemplary network environment 200 for implementing a vulnerability management module (VMM) of the instant disclosure is illustrated.

Conventional system, that does not implement a VMM of the instant disclosure, may not be able to dynamically manage and execute testable vulnerability criteria from SCCM.

According to exemplary embodiments, the above-described problems associated with conventional approach of managing vulnerability may be overcome by implementing a VMM 202 as illustrated in FIG. 2 that may provide a platform for dynamically execute evaluation criteria for an endpoint device (i.e., an end user computing device or a target computing device), dynamically add an affected endpoint to a SCCM static software advertisement specific to a matching vulnerability, thereby reducing endpoint utilization in terms of memory, processor, disk, and communications overhead. The VMM 202 may be the same or similar to the computer system 102 as described with respect to FIG. 1. According to exemplary embodiments, the VMM 202 may also be implemented on an endpoint device that may be considered to be a two-way interactive communication device such as a mobile computing device, cellular phone, landline phone or an Internet appliance controller.

As is commonly known, a vulnerability may include an exploitable weakness on an endpoint device that may result from the device hardware or software. As also is commonly known, vulnerabilities may arise due to weaknesses in the device's operating system, other software or hardware flaws in the device, protocol implementation or specification flaws, misconfiguration of the device, software applications installed or stored on the device, or services provided through, to or by the device, and a vulnerability criteria may include descriptions of these vulnerabilities.

The VMM 202 may store one or more applications that can include executable instructions that, when executed by the VMM 202, cause the VMM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VMM 202 itself, may be located in virtual server(s) running in a cloud-based computing environment rather than being tied to one or more specific physical network computing devices. Also, the application(s) may be running in one or more virtual machines (VMs) executing on the VMM 202. Additionally, in one or more embodiments of this technology, virtual machine(s) running on the VMM 202 may be managed or supervised by a hypervisor.

In the network environment 200 of FIG. 2, the VMM 202 is coupled to a plurality of server devices 204(1)-204(n) that hosts a plurality of databases 206(1)-206(n), and also to a plurality of client devices 208(1)-208(n) via communication network(s) 210. A communication interface of the VMM 202, such as the network interface 114 of the computer system 102 of FIG. 1, operatively couples and communicates between the VMM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VMM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VMM 202 may be a standalone device or integrated with one or more other devices or apparatuses, such as one or more of the server devices 204(1)-204(n), for example. In one particular example, the VMM 202 may be hosted by one of the server devices 204(1)-204(n), and other arrangements are also possible. Moreover, one or more of the devices of the VMM 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the VMM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the VMM 202 that may efficiently provide a platform for dynamically execute evaluation criteria for an endpoint device (i.e., an end user computing device or a target computing device), dynamically add an affected endpoint to a SCCM static software advertisement specific to a matching vulnerability, thereby reducing endpoint utilization in terms of memory, processor, disk, and communications overhead. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the VMM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the VMM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VMM 202, the server devices 204(1)-204(n), or the client devices 208(1)-208(n), for example, may be configured to operate as virtual instances on the same physical machine. For example, one or more of the VMM 202, the server devices 204(1)-204(n), or the client devices 208(1)-208(n) may operate on the same physical device rather than as separate devices communicating through communication network(s) 210. Additionally, there may be more or fewer VMMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
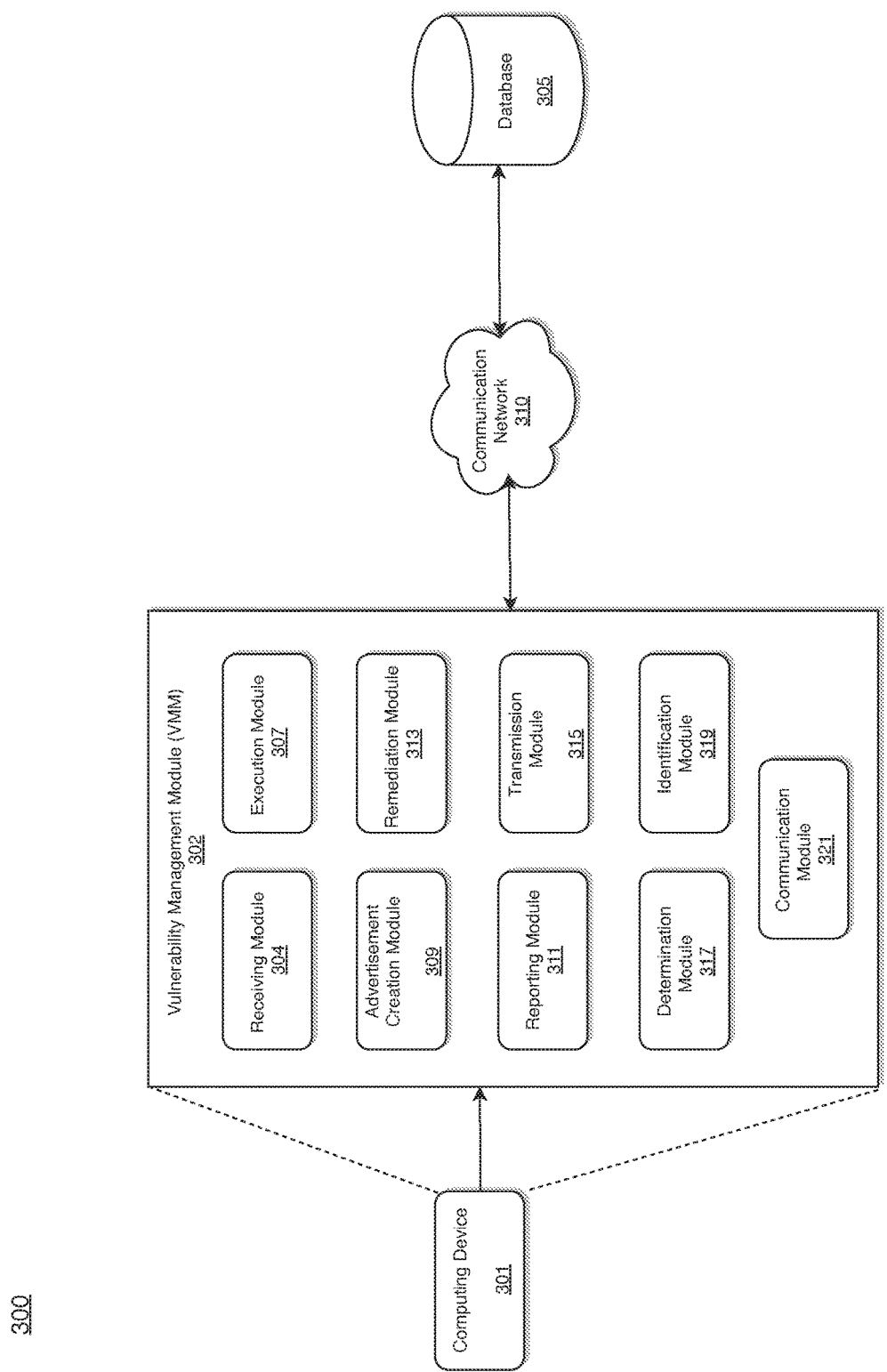
FIG. 3 illustrates a system diagram for implementing a vulnerability management module in accordance with an exemplary embodiment.

FIG. 3 illustrates a system diagram for implementing a vulnerability management module in accordance with an exemplary embodiment. According to exemplary embodiments, a system 300 is described and shown in FIG. 3 as including a VMM 302, although it may include other rules, policies, modules, databases, or applications, for example. As commonly known, a vulnerability may be a weakness in a computing device or a computing system, etc., because of which, threat or malicious activity may enter into the computing device or the computing system and affect the overall functionalities by damaging computing device or the computing system or corrupting the information inside the computing device or the computing system. In general, there are two types of vulnerabilities—known and unknown (zero day). Known vulnerabilities may be those attacks or threats that are found and reported to a graphical user interface (GUI) of an endpoint computing device before a hacker actually exploits the vulnerabilities. Unknown or zero day vulnerabilities may be those attacks or threats that may try to exploit computer application vulnerabilities that are unknown to others or the software developers. For example, a developer may create a software containing an unknown vulnerability. Zero day may simply indicate that a hacker may find the vulnerability before the developer does. Then the hacker may write and distribute an exploit while the vulnerability is not known to the developer. After performing a vulnerability scan, the developer may become aware of the vulnerability and may develop code to fix or remediate the vulnerability.

As will be described below, according to exemplary embodiments, the VMM 302 may be configured for dynamically managing and executing testable vulnerability criteria from an SCCM that may efficiently address and remediate both known and unknown vulnerabilities. As commonly known, one of the primary features of an SCCM may be its ability to distribute software packages to client computers, and a software package may allow an administrator the ability to systematically distribute updates to clients (i.e., end points or end user computing devices). For example, the updates may be new software, command lines, registry modifications, scripts etc. The SCCM may allow an SCCM agent a framework to centrally manage and standardize an entire network of client computers. As commonly known, there may be three components involved in a software distribution: i) the package; ii) the collection; and iii) the advertisement. The package may be the 'what' of the distribution and may be anything from a software package to a command line. The package may consist of four parts: the source files, the package definition, the program and the distribution points. The collection may be the 'who' of the distribution and may be where the system specifies who may receive the update. According to exemplary embodiments, target workstation computers (i.e., endpoints or end user computing device) may receive the update. The advertisement may be the 'when' of the distribution and may be how the system specifies when the update runs. The advertisement may be a process of applying a specific package to a specific collection. According to exemplary embodiments, advertisements may be set to start as soon as possible or at some point in the future and may be set to expire at a specific time.

According to exemplary embodiments, the VMM 302 may be configured to change an SCCM advertisement from a static to a dynamic representation and execution capabilities, provide lifecycle vulnerability management capabilities natively to SCCM, re-purpose SCCM native reporting capabilities for vulnerability management, re-purpose the intended use of static pre/post validation checks for software installation to a dynamic pre/post validation checks for vulnerabilities, leverage SCCM classification of software installed or not installed as a means to determine if a vulnerability is applicable or not applicable, and leverage SCCM classification of not installed (not applicable) to determine when vulnerabilities are remediated.

As shown in FIG. 3, an exemplary system 300 may include a computing device 301 within which the VMM 302 may be embedded, a database 305 which may store testable vulnerability criteria, and a communication network 310 via which the computing device 301, the VMM 302, and the database 305 are interconnected to exchange data. The computing device 301 may be the same or equivalent to the computing device 208 as illustrated in FIG. 2, the database 305 may include a memory (not shown) and may be the same or equivalent to the server 204 as illustrated in FIG. 2, and the communication network 310 may be the same or equivalent to the communication network 210 as illustrated in FIG. 2.

As shown in FIG. 3, the VMM 302 may include a receiving module 304, an execution module 307, an advertisement creation module 309, a reporting module 311, a remediation module 313, a transmission module 315, a determination module 317, an identification module 319, and a communication module 321.

The process may be executed via the communication network(s) 310, which may comprise plural networks as described above. For example, in an exemplary embodiment, the various components of the VMM 302 may communicate with the database 305 via the communication module 321 and the communication network(s) 310. Of course, these embodiments are merely exemplary and are not limiting or exhaustive.

According to exemplary embodiments, the VMM 302 may be implemented into the computing device 301 (which may be referred to as an endpoint or a target endpoint, or simply a target computing device) by configuring SCCM to provide lifecycle vulnerability management capabilities natively to the SCCM, by utilizing the above-described modules.

According to exemplary embodiments, the receiving module 304 may be configured to receive a request for dynamically scanning vulnerability of the computing device 301 based on the testable vulnerability criteria that may be accessed from the database 305 via the communication network 310 and the communication module 321. The execution module 307 may be configured to dynamically execute the testable vulnerability criteria from the SCCM based on the received request. The advertisement creation module 309 may be configured to create a static SCCM advertisement with a dynamic pre/post validation check capability based on a result of the dynamically executing the testable vulnerability criteria by the execution module 307. The reporting module 311 may be configured to report a success or a failure of the static SCCM advertisement to a GUI (not shown) on the computing device 301 related to the testable vulnerability criteria to indicate whether a vulnerability exists within the computing device 301. The remediation module 313 may be configured to automatically remediate the vulnerability when it is determined that the vulnerability exists within the computing device 301.

According to exemplary embodiments, the creation of the static SCCM advertisement with a dynamic pre/post validation check may include configuring the VMM 302 to dynamically extract the testable vulnerability criteria from the database 305. This way the testable vulnerability criteria may not be necessary to be prepackaged and deployed from the server side as required by conventional package delivery to a target computing device. According to exemplary embodiments, the creation of the static SCCM advertisement with a dynamic pre/post validation check may further include configuring the VMM 302 to dynamically execute, by the execution module 307, evaluation criteria for the computing device 301 based on the extracted testable vulnerability criteria and dynamically add an affected component (i.e., a vulnerable component) of the computing device 301 to an SCCM static software advertisement specific to a matching vulnerability.

According to exemplary embodiments, the testable vulnerability criteria may include vulnerability signatures related to positive and negative criteria. As commonly known, a vulnerability signature may be a representation (e.g., a regular expression) of a vulnerability language. For example, unlike exploit-based signatures whose error rate may be empirically measured for known test cases, the quality of a vulnerability signature may be formally quantified for all possible inputs. Evaluation of vulnerabilities with vulnerability signatures would provide a clear picture of all hosts on the network, the service that they provide, and also information on the known vulnerabilities.

According to exemplary embodiments, the positive criteria may include information that indicates that a vulnerable piece of software may be installed on the computing device 301 that may make the computing device 301 prone to various attacks or threats. The negative criteria may include information that indicates that even though a vulnerable piece of software may be installed on the computing device 301, the computing device 301 may not actually be vulnerable because of a pre-installed control software or some firewall in the computing device 301 that may mitigate the vulnerable piece of software to be exploited for attacks or threats. For example, with reference to the negative criteria, the computing device 301 may be provided with a software embedded therein that may actually prevent the specific type of vulnerability from propagating or initiating. For example, the system configuration of the computing device 301 may include a firewall rule that may block the vulnerability from accessing a site it needs to activate or communicate to actually put the computing device 301 at risk.

According to exemplary embodiments, the VMM 302 may be configured to receive, via the receiving module 304, a request from the computing device 301 for extracting the vulnerability signatures related to the positive and negative criteria from the database 305 and dynamically determine, by the determination module 317, whether signatures are required for a vulnerability to be applicable to the computing device 301 based on the received request at the receiving module 304 for the vulnerability signatures. According to exemplary embodiments, the VMM 302 may be further configured to transmit a signature payload to the SCCM embedded on the computing device 301 based on a determination that a signature related to the positive criteria is required for the vulnerability to be applicable to the computing device 301, Further, according to exemplary embodiments, the VMM 302 may be configured to execute, by the execution module 307, the signature payload using native SCCM scripting language and identifying, by the identification module 319, a vulnerability signature for a positive match.

According to exemplary embodiments, when the vulnerability signature identifies for the positive match, the VMM 302 may be configured to identify, by the identification module 319, a vulnerability signature for a negative match and evaluate the negative criteria by the remediation module 313, and request, by the computing device 301 that includes the SCCM, a new advertisement based on the positive criteria and/or the negative criteria. According to exemplary embodiments, when the vulnerability signature identifies for the positive match and the negative match, the VMM 302 may be further configured to create, by the advertisement creation module 309, a static payload for each positive match vulnerability, and create an advertisement for each static payload with identified true risk rating (i.e., critical, high, medium, low risk of vulnerability) based on the negative criteria. According to exemplary embodiments, when the advertisement creation module 309 creates an advertisement for each static payload with the identified true risk rating based on the negative criteria, the VMM 302 may be further configured to request for statically scanning vulnerability of the computing device 301 based on the created advertisement for each static payload. According to exemplary embodiments, the determination module 317 may be configured to determine whether a vulnerability is applicable or not applicable to the computing device 301 by reconfiguring a classification functionality of the SCCM. According to exemplary embodiments, the determination module 317 may further be configured to determine whether a vulnerability is remediated from the target computing device by reconfiguring a classification functionality of the SCCM. According to exemplary embodiments, the remediation may include creating a code to mitigate the vulnerability.

Thus, the exemplary embodiments disclosed herein may provide a platform for implementing the VMM 302 for dynamically managing and executing testable vulnerability criteria from the SCCM by repurposing and enhancing the SCCM functionalities, thereby removing the need for a separate vulnerability management solution and agent, and reducing endpoint utilization in terms of memory, processor, disk, and communications overhead.

Figure 4A:
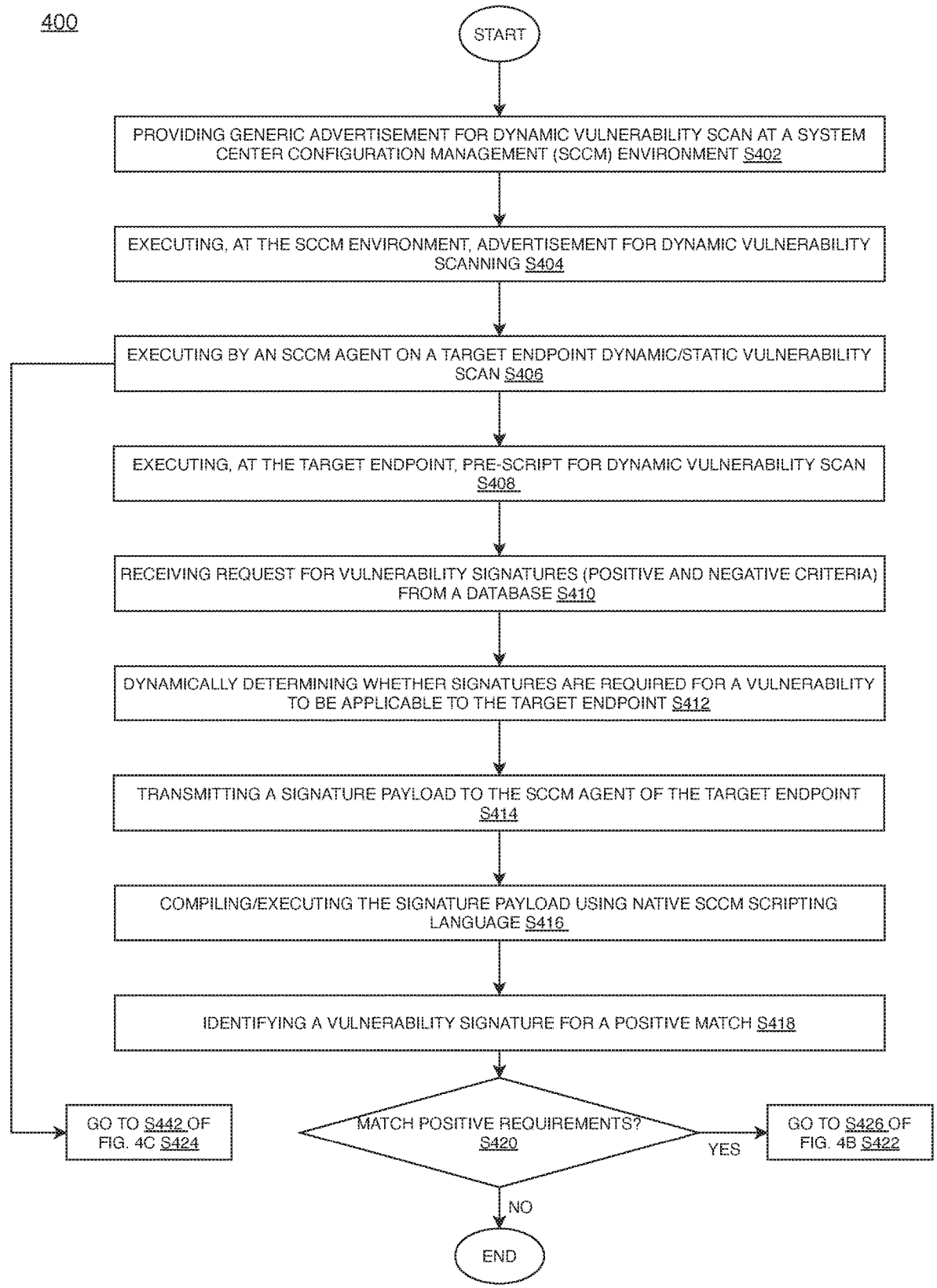
FIG. 4A, FIG. 4B, and FIG. 4C together illustrate a flow chart of a process for implementing a vulnerability management module in accordance with an exemplary embodiment.
Figure 4B:
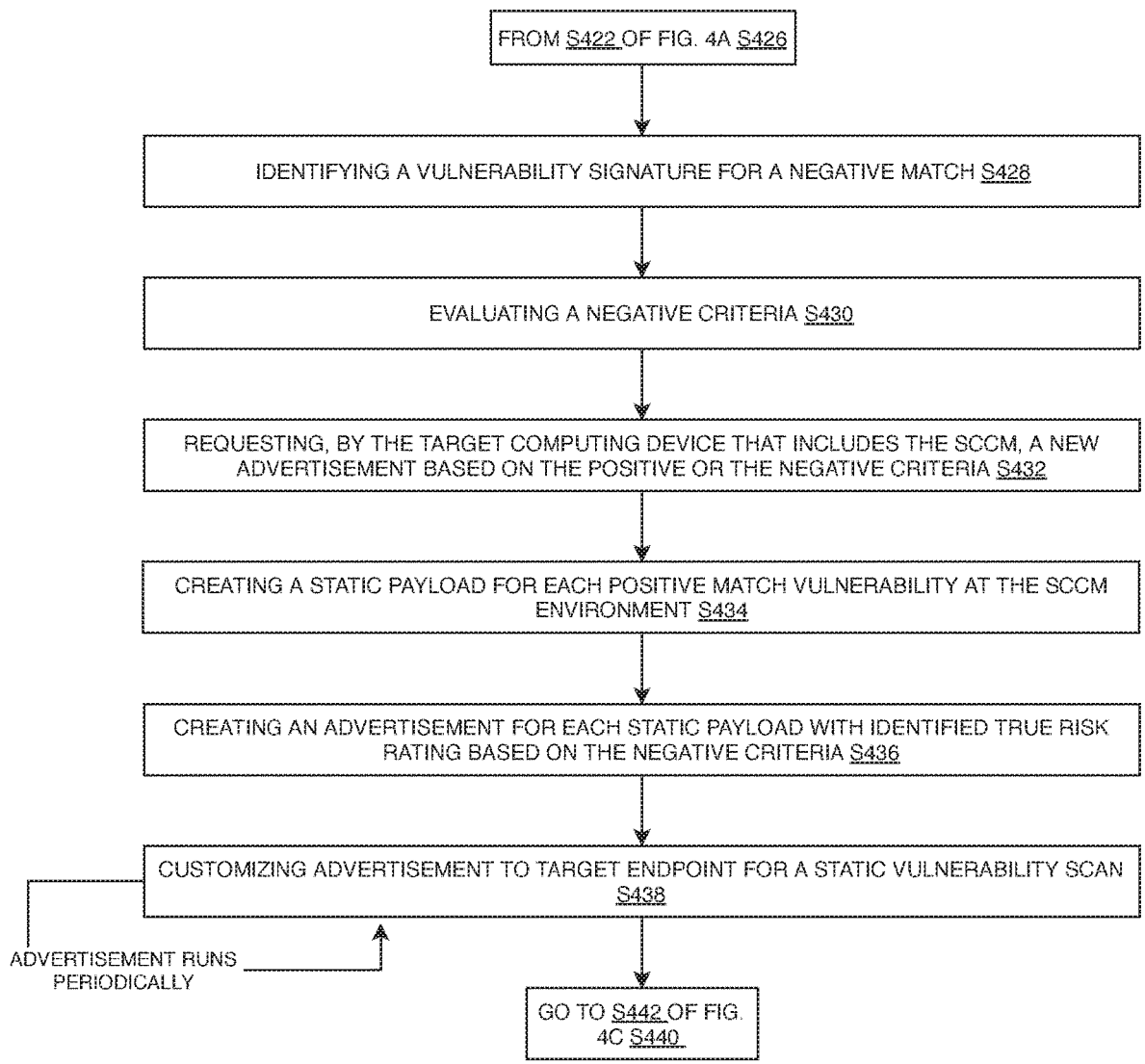
Figure 4C:
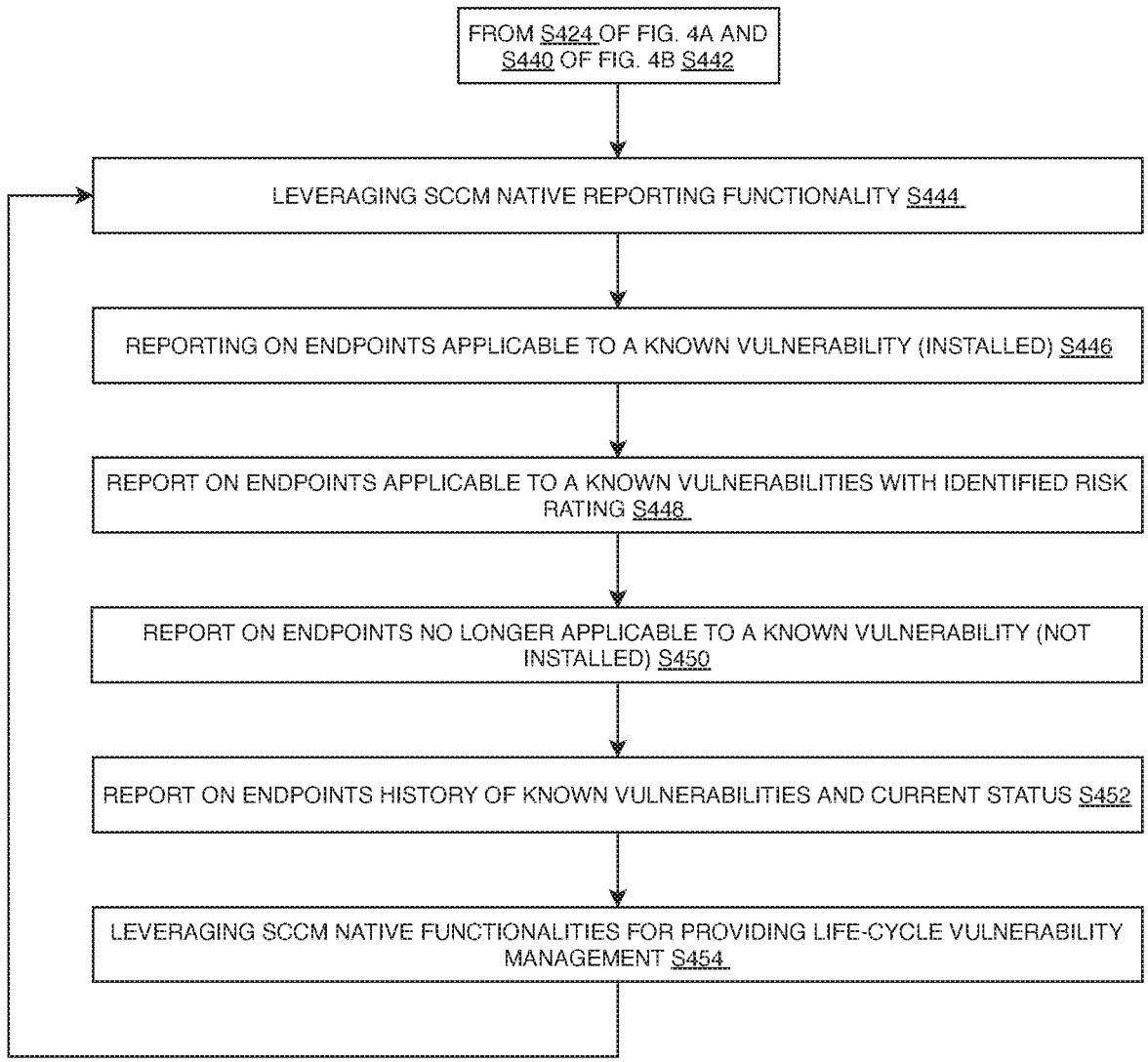

FIG. 4A, FIG. 4B, and FIG. 4C together illustrate a flow chart of a process 400 for implementing a vulnerability management module in accordance with an exemplary embodiment. The vulnerability management module may be the same or similar to the VMM 202 of FIG. 2 or to the VMM 302 of FIG. 3.

As illustrated in FIG. 4A, at step S402, a generic advertisement may be provided for dynamic vulnerability scan at an SCCM environment. According to exemplary embodiments, the SCCM may be the same or similar to the SCCM embedded within the computing device 301.

According to exemplary embodiments, at step S404, advertisement for dynamic vulnerability scanning may be executed at the SCCM environment, and, at step S406, an SCCM agent on a target endpoint may execute, by utilizing an execution module, dynamic/static vulnerability scan on the target endpoint. At step S408, pre-script for dynamic vulnerability scan may be executed by the execution module at the target endpoint. According to exemplary embodiment, the target endpoint may be the same or similar to the computing device 301 as described above with reference to FIG. 3, and the execution module may be the same or similar to the execution module 307 as described above with reference to FIG. 3.

At step S410, a request may be received by a receiving module for vulnerability signatures related to positive and negative criteria from a database. According to exemplary embodiment, the receiving module may be the same or similar to the receiving module 304 as described above with reference to FIG. 3, and the database may be the same or similar to the database 305 as described above with reference to FIG. 3.

At step S412, a determination module may dynamically determine whether signatures are required for a vulnerability to be applicable to the target endpoint (i.e., the computing device 301). According to exemplary embodiment, the determination module may be the same or similar to the determination module 317 as described above with reference to FIG. 3.

At step S414, a transmission module may transmit a signature payload to the SCCM agent of the target endpoint. According to exemplary embodiment, the transmission module may be the same or similar to the transmission module 315 as described above with reference to FIG. 3.

At step S416, the execution module 307 may further compile or execute the signature payload using native SCCM scripting language.

At step S418, an identification module may identify a vulnerability signature for a positive match. According to exemplary embodiment, the identification module may be the same or similar to the identification module 319 as described above with reference to FIG. 3.

At step S420, the process 400 may check whether positive requirements match to known requirements to identify vulnerability. If it is determined at step S420 that there is no match for positive requirements (i.e., no known or unknown vulnerability found), the process 400 ends. However, if it is determined, at step S420, that there is a match for positive requirements (i.e., data indicating the vulnerability identified, and/or the execution module's scanning process discovers the vulnerability), the process 400, at step S422, proceeds to step S426 of FIG. 4B. In addition, at step S424, the process 400 proceeds to step S442 of FIG. 4C for reporting dynamic/static vulnerability scanning results provided by the execution module 307.

Referring to FIG. 4B, at step S426, the process 400 continues from step S422 of FIG. 4A. At step S428, the identification module 319 identifies a vulnerability signature for a negative match when it is determined at step S420 of FIG. 4A that there is a match for a positive requirement.

At step S430, the VMM 302 evaluates a negative criteria.

At step S432, the target computing device 301 that includes the VMM 302 requests a new advertisement based on the positive and/or the negative criteria. According to exemplary embodiments, the advertisement may be based on a combination of both the positive criteria and the negative criteria in cases where the vulnerability risk may be reduced but not completely mitigated.

At step S434, an advertisement creation module may create a static payload for each positive match vulnerability at the SCCM environment, and, at step S436, the advertisement creation module may further create an advertisement for each static payload with identified true risk rating as identified by the identification module 319 based on the negative criteria. According to exemplary embodiment, the advertisement creation module may be the same or similar to the advertisement creation module 309 as described above with reference to FIG. 3.

At step S438, the advertisement creation module 309 may further customize an advertisement to the target endpoint (i.e., the computing device 301) for a static vulnerability scan. The VMM 302 may be configured to run this customized advertisement periodically. At step S440, the process 400 proceeds to step S442 of FIG. 4C. Referring to FIG. 4C, at step S442, the process 400 continues from step S424 of FIG. 4A and step S440 of FIG. 4B. At step S444, the VMM 302 may be configured to leverage the SCCM native reporting functionality. At step S446, known vulnerabilities (i.e., indicating that the vulnerabilities have been installed in the target endpoint) that may applicable to the target endpoint (i.e., the computing device 301) may be reported on a GUI on the target endpoint (i.e., the computing device 301). At step S448, known vulnerabilities with identified risk rating may be reported on the GUI on the target endpoint (i.e., the computing device 301). At step S450, the GUI may report on the target endpoint that the known vulnerabilities are no longer applicable (i.e., not installed) to the target endpoint. At step S452, the GUI may report on the target endpoint history of know vulnerabilities and current status of the vulnerabilities. At step 454, the VMM 302 may leverage the SCCM native functionalities for providing a life-cycle vulnerability management. As commonly known, a life-cycle of a vulnerability management may include a loop of processes starting from discovering a vulnerability, prioritizing assets, assessing risk of the vulnerability, reporting results with possible suggestions of remediation of the vulnerability, remediating the vulnerability, and ending with verifying whether vulnerability still exists within the computing device.

Thus, according to exemplary embodiments, FIGS. 4A, 4B and 4C may provide optimized processes of implementing a vulnerability management module for dynamically managing and executing testable vulnerability criteria from an SCCM, thereby changing SCCM advertisement from static to dynamic, providing lifecycle vulnerability management capabilities natively to SCCM, re-purposing SCCM native reporting capabilities for vulnerability management, re-purposing the intended use of static pre/post validation checks for software installation to a dynamic prepost validation checks for vulnerabilities, leveraging SCCM classification of software installed or not installed as a means to determine if a vulnerability is applicable or not applicable, and leveraging SCCM classification of not installed (not applicable) to determine when vulnerabilities are remediated, but the disclosure is not limited to these above-noted enhancements to the existing functionalities of Microsoft's SCCM.

Figure 5:
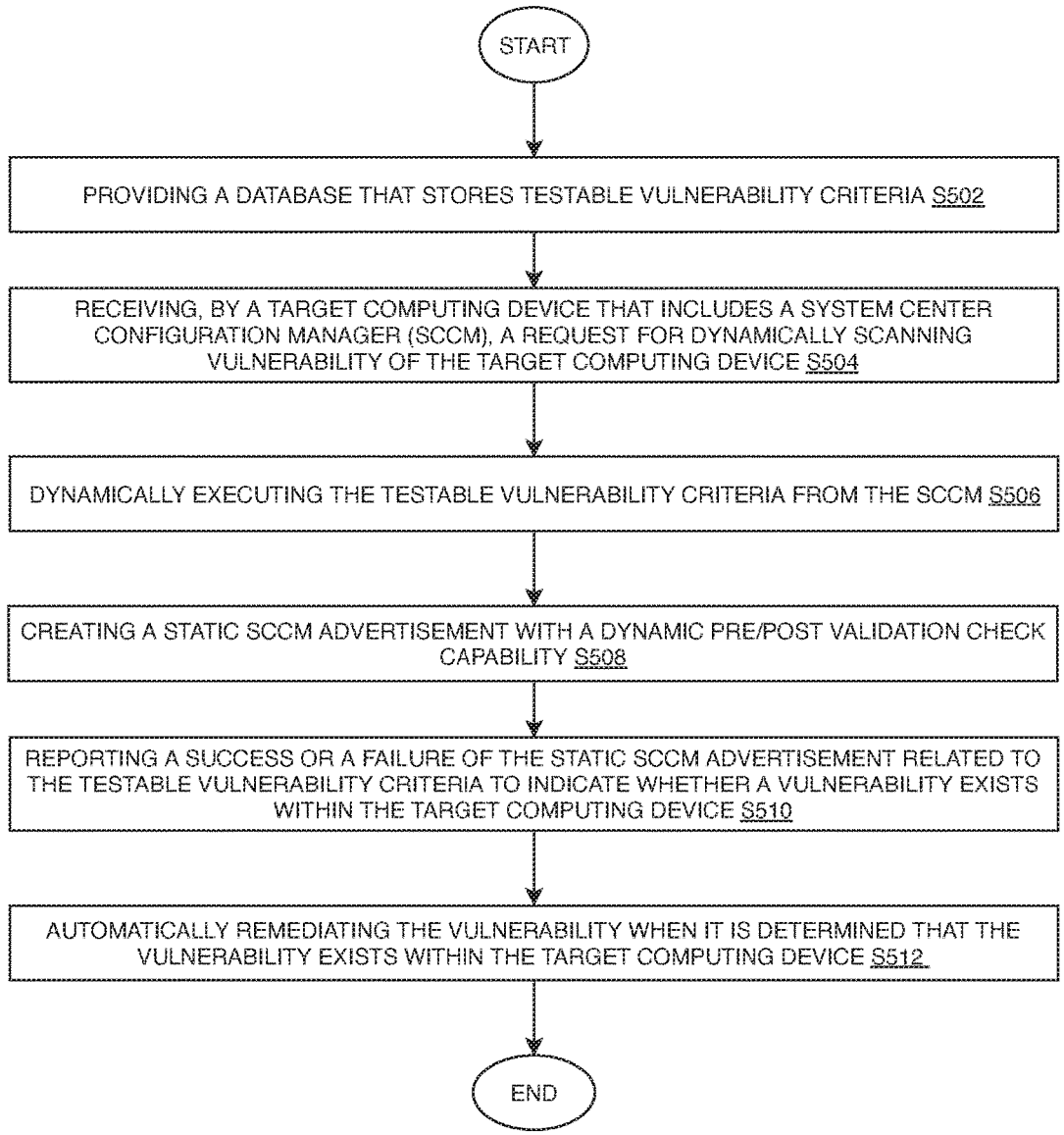
FIG. 5 illustrates a flow chart of a process for implementing a vulnerability management module in accordance with an exemplary embodiment.

FIG. 5 illustrates a flow chart of a process 500 for implementing a vulnerability management module in accordance with an exemplary embodiment for configuring an SCCM to provide lifecycle vulnerability management capabilities natively to the SCCM.

At step S502, a database may be provided that may store testable vulnerability criteria. According to exemplary embodiments, the database may be the same or similar to the database 305 as illustrated with respect to FIG. 3.

At step S504, a target computing device that includes the SCCM may receive, via a receiving module, a request for dynamically scanning vulnerability of the target computing device based on the testable vulnerability criteria. According to exemplary embodiments, the target computing device may be the same or similar to the computing device 301 as illustrated in FIG. 3, and the receiving module may be the same or similar to the receiving module 304 as illustrated in FIG. 3.

At step S5506, an execution module may dynamically execute the testable vulnerability criteria from the SCCM based on the received request. According to exemplary embodiments, the execution module may be the same or similar to the execution module 307 as illustrated in FIG. 3;

At step S508, an advertisement creation module may create a static SCCM advertisement with a dynamic pre/post validation check capability based on a result of the dynamically executing the testable vulnerability criteria. According to exemplary embodiments, the advertisement creation module may be the same or similar to the advertisement creation module 309 as illustrated in FIG. 3.

At step S510, a reporting module may report a success or a failure of the static SCCM advertisement related to the testable vulnerability criteria to indicate whether a vulnerability exists within the target computing device. According to exemplary embodiments, the reporting module may be the same or similar to the reporting module 311 as illustrated in FIG. 3.

At step S512, a remediation module may automatically remediate the vulnerability when it is determined that the vulnerability exists within the target computing device 301. According to exemplary embodiments, the remediation module may be the same or similar to the remediation module as illustrated in FIG. 3.

Thus, the exemplary embodiments disclosed herein with reference to FIGS. 1-5 may provide a platform for implementing the VMM 302 for dynamically managing and executing testable vulnerability criteria from the SCCM by repurposing and enhancing the SCCM functionalities, thereby removing the need for a separate vulnerability management solution and agent, and reducing endpoint utilization in terms of memory, processor, disk, and communications overhead.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a vulnerability management module, for configuring a system center configuration manager (SCCM) to provide lifecycle vulnerability management capabilities natively to the SCCM, by utilizing one or more processors and one or more memories, the method comprising:
providing a database that stores testable vulnerability criteria;
receiving, by a target computing device that includes the SCCM, a request for dynamically scanning vulnerability of the target computing device based on the testable vulnerability criteria;
dynamically executing the testable vulnerability criteria from the SCCM based on the received request;
creating a static SCCM advertisement with a dynamic pre/post validation check capability based on a result of the dynamically executing the testable vulnerability criteria;
reporting a success or a failure of the static SCCM advertisement related to the testable vulnerability criteria to indicate whether a vulnerability exists within the target computing device; and
automatically remediating the vulnerability when it is determined that the vulnerability exists within the target computing device,
wherein the creating a static SCCM advertisement with a dynamic pre/post validation check includes:
dynamically extracting the testable vulnerability criteria from the database;
dynamically executing evaluation criteria for the target computing device based on the extracted testable vulnerability criteria; and
dynamically adding an affected component of the target computing device to an SCCM static software advertisement specific to a matching vulnerability, wherein the testable vulnerability criteria includes vulnerability signatures related to positive and negative criteria, and the method further comprising:
receiving a request from the target computing device for extracting the vulnerability signatures related to the positive and negative criteria from the database;
dynamically determining whether signatures are required for a vulnerability to be applicable to the target computing device based on the received request for the vulnerability signatures;
transmitting a signature payload to the SCCM of the target computing device based on a determination that a signature related to the positive criteria is required for the vulnerability to be applicable to the target computing device;
executing the signature payload using native SCCM scripting language; and
identifying a vulnerability signature for a positive match, and
wherein the negative criteria includes information that indicates that even though a vulnerable piece of software is installed on the target computing device, the target computing device is not actually vulnerable because of a preinstalled control software in the target computing device that mitigates the vulnerable piece of software.

2. The method according to claim 1, wherein, when the vulnerability signature is identified for the positive match, the method further comprising:
identifying a vulnerability signature for a negative match;
evaluating the negative criteria;
requesting, by the target computing device that includes the SCCM, a new advertisement based on the positive criteria and/or the negative criteria;
creating a static payload for each positive match vulnerability;
creating an advertisement for each static payload with identified true risk rating based on the negative criteria; and
requesting for statically scanning vulnerability of the target computing device based on the created advertisement for each static payload.

3. The method according to claim 1, wherein the positive criteria includes information that indicates that a vulnerable piece of software is installed on the target computing device.

4. The method according to claim 1, further comprising:
determining whether a vulnerability is applicable or not applicable to the target computing device by reconfiguring a classification functionality of the SCCM.

5. The method according to claim 1, further comprising:
determining whether a vulnerability is remediated from the target computing device by reconfiguring a classification functionality of the SCCM.

6. A system for implementing a vulnerability management module, for configuring a system center configuration manager (SCCM) to provide lifecycle vulnerability management capabilities natively to the SCCM, the system comprising:
a database that stores testable vulnerability criteria;
a receiver configured to receive a request for dynamically scanning vulnerability of a target computing device that includes the SCCM based on the testable vulnerability criteria; and
a processor coupled to the database and the receiver via a communication network, wherein the processor is configured to:
dynamically execute the testable vulnerability criteria from the SCCM based on the received request;
create a static SCCM advertisement with a dynamic pre/post validation check capability based on a result of the dynamically executing the testable vulnerability criteria;
report a success or a failure of the static SCCM advertisement related to the testable vulnerability criteria to indicate whether a vulnerability exists within the target computing device; and
automatically remediate the vulnerability when it is determined that the vulnerability exists within the target computing device,
wherein the processor is further configured to:
dynamically extract the testable vulnerability criteria from the database;
dynamically execute evaluation criteria for the target computing device based on the extracted testable vulnerability criteria; and
dynamically add an affected component of the target computing device to an SCCM static software advertisement specific to a matching vulnerability,
wherein the testable vulnerability criteria includes vulnerability signatures related to positive and negative criteria, wherein the receiver is configured to receive a request from the target computing device for extracting the vulnerability signatures related to the positive and negative criteria from the database, wherein the processor is further configured to:
dynamically determine whether signatures are required for a vulnerability to be applicable to the target computing device based on the received request for the vulnerability signatures;
transmit a signature payload to the SCCM of the target computing device based on a determination that a signature related to the positive criteria is required for the vulnerability to be applicable to the target computing device;
execute the signature payload using native SCCM scripting language; and
identify a vulnerability signature for a positive match, wherein the negative criteria includes information that indicates that even though a vulnerable piece of software is installed on the target computing device, the target computing device is not actually vulnerable because of a preinstalled control software in the target computing device that mitigates the vulnerable piece of software.

7. The system according to claim 6, wherein, when the vulnerability signature is identified for the positive match, the processor is further configured to:
identify a vulnerability signature for a negative match;
evaluate the negative criteria;
request, by the target computing device that includes the SCCM, a new advertisement based on the positive criteria and/or the negative criteria;
create a static payload for each positive match vulnerability;
create an advertisement for each static payload with identified true risk rating based on the negative criteria; and
request for statically scanning vulnerability of the target computing device based on the created advertisement for each static payload.

8. The system according to claim 6, wherein the positive criteria includes information that indicates that a vulnerable piece of software is installed on the target computing device.

9. The system according to claim 6, wherein the processor is further configured to:

determine whether a vulnerability is applicable or not applicable to the target computing device by reconfiguring a classification functionality of the SCCM.

10. The system according to claim 6, wherein the processor is further configured to:
determine whether a vulnerability is remediated from the target computing device by reconfiguring a classification functionality of the SCCM.

11. A non-transitory computer readable medium configured to store instructions for implementing a vulnerability management module for configuring a system center configuration manager (SCCM) to provide lifecycle vulnerability management capabilities natively to the SCCM, wherein, when executed, the instructions cause a processor to perform the following:
receiving, by a target computing device that includes the SCCM, a request for dynamically scanning vulnerability of the target computing device based on testable vulnerability criteria stored onto a database;
dynamically executing the testable vulnerability criteria from the SCCM based on the received request;
creating a static SCCM advertisement with a dynamic pre/post validation check capability based on a result of the dynamically executing the testable vulnerability criteria;
reporting a success or a failure of the static SCCM advertisement related to the testable vulnerability criteria to indicate whether a vulnerability exists within the target computing device; and
automatically remediating the vulnerability when it is determined that the vulnerability exists within the target computing device,
wherein, when executed, the instructions further cause the processor to perform the following:
dynamically extracting the testable vulnerability criteria from the database;
dynamically executing evaluation criteria for the target computing device based on the extracted testable vulnerability criteria; and
dynamically adding an affected component of the target computing device to an SCCM static software advertisement specific to a matching vulnerability,
wherein the testable vulnerability criteria includes vulnerability signatures related to positive and negative criteria, and wherein, when executed, the instructions further cause the processor to perform the following:
receiving a request from the target computing device for extracting the vulnerability signatures related to the positive and negative criteria from the database;
dynamically determining whether signatures are required for a vulnerability to be applicable to the target computing device based on the received request for the vulnerability signatures;
transmitting a signature payload to the SCCM of the target computing device based on a determination that a signature related to the positive criteria is required for the vulnerability to be applicable to the target computing device;
executing the signature payload using native SCCM scripting language; and
identifying a vulnerability signature for a positive match, and
wherein the negative criteria includes information that indicates that even though a vulnerable piece of software is installed on the target computing device, the target computing device is not actually vulnerable because of a preinstalled control software in the target computing device that mitigates the vulnerable piece of software.

12. The non-transitory computer readable medium according to claim 11, wherein, when the vulnerability signature is identified for the positive match, the instructions, when executed, further cause the processor to perform the following:
identifying a vulnerability signature for a negative match;
evaluating the negative criteria;
requesting, by the target computing device that includes the SCCM, a new advertisement based on the positive criteria and/or the negative criteria;
creating a static payload for each positive match vulnerability;
creating an advertisement for each static payload with identified true risk rating based on the negative criteria; and
requesting for statically scanning vulnerability of the target computing device based on the created advertisement for each static payload.

13. The non-transitory computer readable medium according to claim 11, wherein the positive criteria includes information that indicates that a vulnerable piece of software is installed on the target computing device.

14. The non-transitory computer readable medium according to claim 11, wherein, the instructions, when executed, further cause the processor to perform the following:
determining whether a vulnerability is applicable or not applicable to the target computing device by reconfiguring a classification functionality of the SCCM.

15. The non-transitory computer readable medium according to claim 11, wherein, the instructions, when executed, further cause the processor to perform the following:
determining whether a vulnerability is remediated from the target computing device by reconfiguring a classification functionality of the SCCM.

* * * * *